Feb. 24, 1942. W. F. KRENZKE 2,274,487
TRANSPORT TRUCK FOR LAWN MOWERS
Filed Sept. 26, 1940 4 Sheets-Sheet 1

INVENTOR
WILLIAM F. KRENZKE
BY A.S.Krotz
ATTORNEY

Feb. 24, 1942. W. F. KRENZKE 2,274,487
TRANSPORT TRUCK FOR LAWN MOWERS
Filed Sept. 26, 1940 4 Sheets-Sheet 2

INVENTOR
WILLIAM F. KRENZKE
BY A.S.Krotz
ATTORNEY

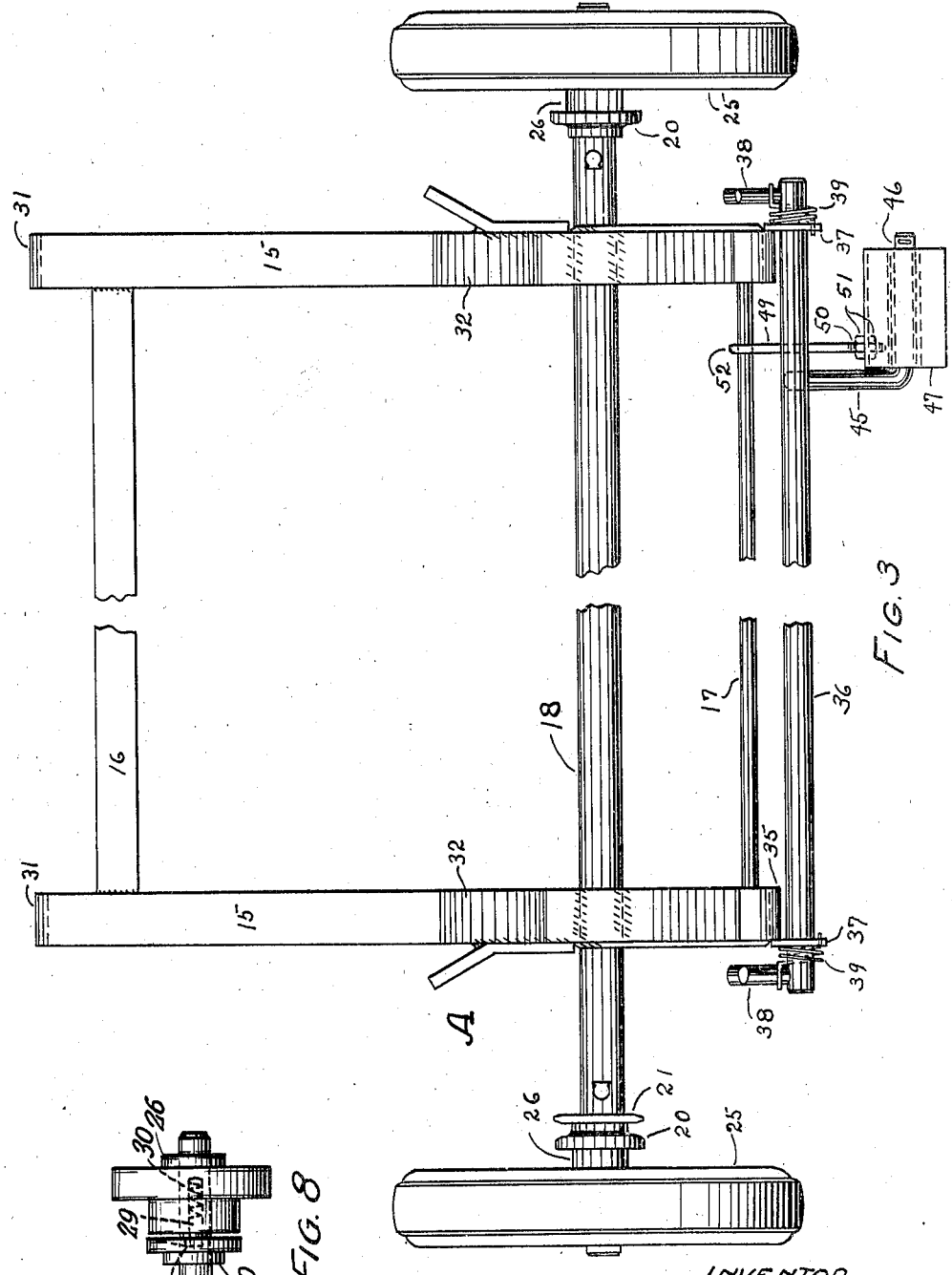

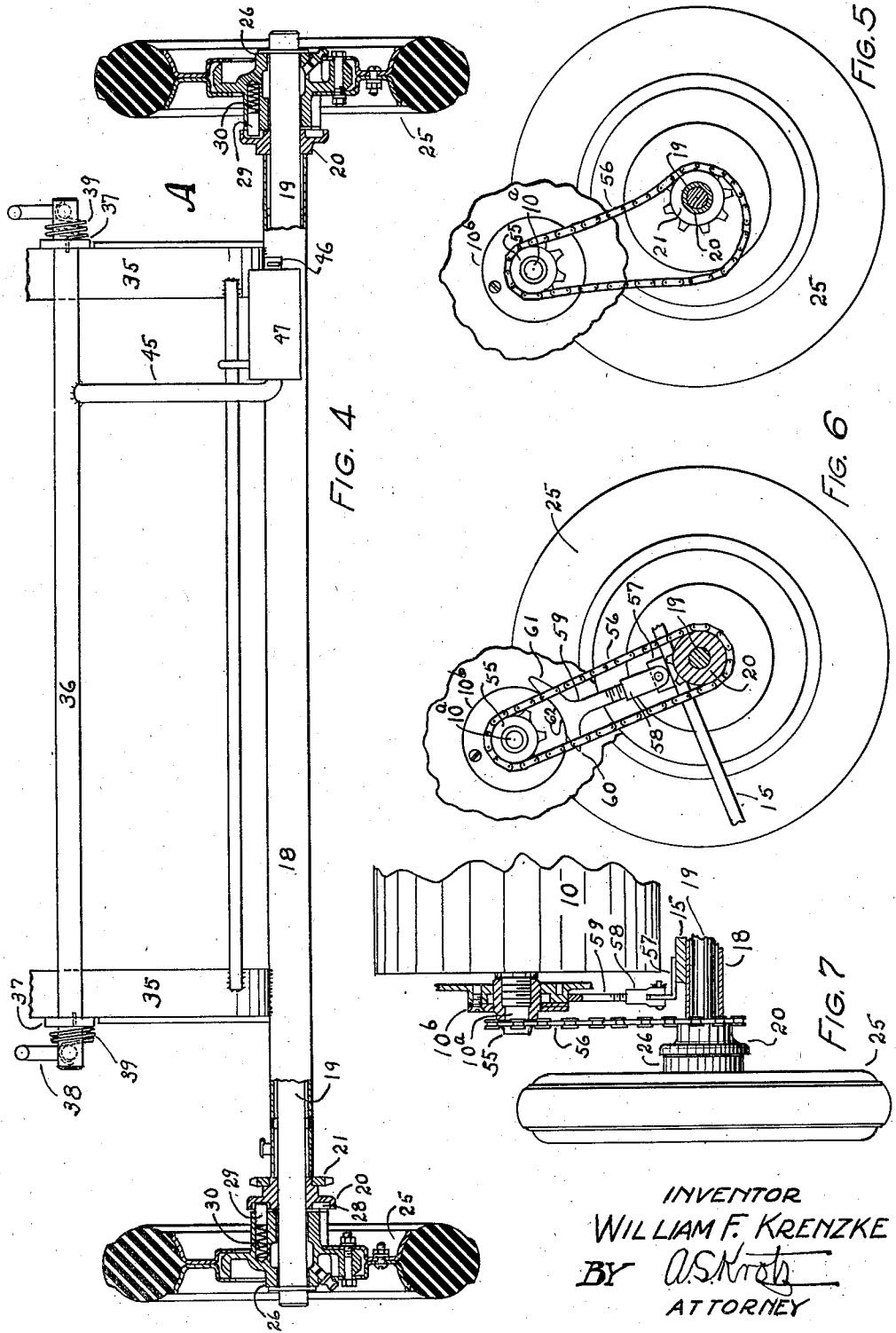

Patented Feb. 24, 1942

2,274,487

UNITED STATES PATENT OFFICE 2,274,487

TRANSPORT TRUCK FOR LAWN MOWERS

William F. Krenzke, Racine, Wis., assignor to Jacobsen Manufacturing Company, Racine, Wis., a company of Wisconsin Application September 26, 1940, Serial No. 358,396

8 Claims. (Cl. 180—16)

The present invention relates to transport trucks for power driven lawn mowers wherein convenient means are provided for loading and unloading and for driving the truck by means of the power plane on the mower.

An object of the present invention is to provide means whereby the mower may be conveniently moved into position on the forecarriage and locked thereto.

Another object of the present invention is to provide means whereby the transport truck will be automatically anchored to the soil while loading the mower and then the mower handle used for releasing the anchor and for guiding the truck manually.

A further object of the present invention is to provide means whereby after the mower has been moved into position on the transport, convenient means is provided for lifting the driving wheels of the mower free of the truck and at the same time, make taut a driving chain for transmitting power from the mower to the wheels of the transport.

An object of the present invention is to provide a foot pad for lifting the mower wheels from the transport and for locking the mower into its lifted position by this same means.

Generally stated, the objects of the present invention are to provide a simple, light, easily and cheaply manufactured transport on which the mower can be easily mounted, without the use of tools.

To these and other useful ends, my invention consists of parts, combinations of parts, or their equivalents, and mode of operation, as hereinafter described, and claimed and shown in the accompanying drawings in which:

Fig. 3 is a top view of my improved transport truck.

Fig. 4 is a rear view of the transport truck, as shown in Figure 3.

Fig. 5 illustrates the position of the driving chain before the mower has been raised and locked into position.

Fig. 6 illustrates the chain after the mower has been raised and locked into position.

Fig. 7 is a rear view of the device, as illustrated in Figure 6.

Fig. 8 illustrates a wheel rachet, the operating parts being shown in dotted lines.

Figure 1:
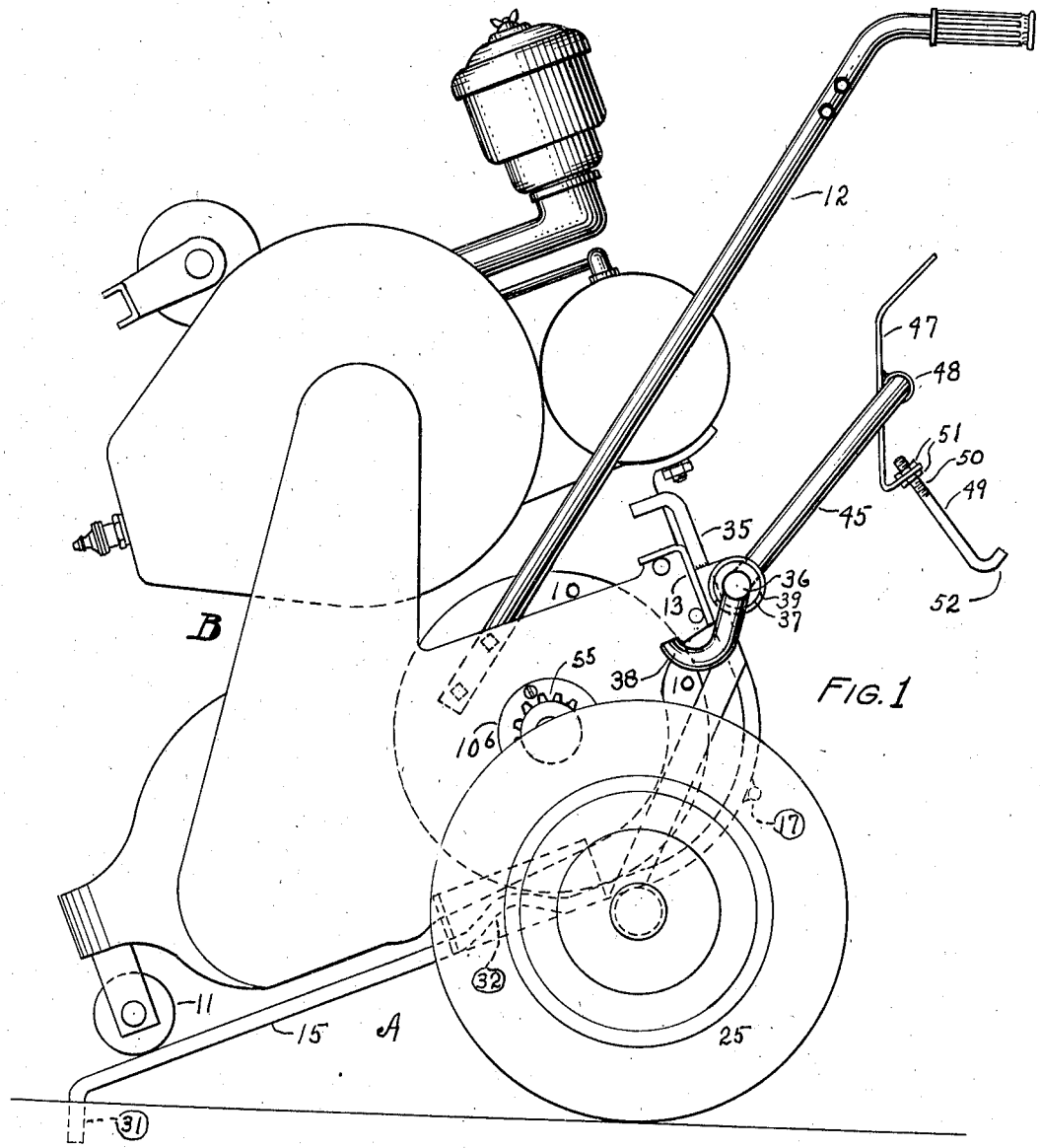
Fig. 1 is a side elevational view of my transport having a power driven mower mounted thereon but before being lifted and locked into position.

As thus illustrated, my transport truck is, in its entirety, designated by reference character A and the mower is, in its entirety, designated by reference character B. Member B illustrates a well known power driven lawn mower having a rear carrying and driving drum 10 and small front end carrying wheels 11—11 (one not shown). Wheels 11 may be castered or otherwise mounted on the mower frame.

The mower is provided with rearwardly and upwardly extending spaced handle bars 12—12 (one not shown). Suitable rods (not shown) extend to within easy reach of the operator and to the clutch and motor controlling means. The mower frame is provided preferably with a transverse angle bar 13 for a purpose which will hereinafter appear.

Transport truck A comprises side bars 15—15, a front transverse bar 16 and a rear bar 17. I mount axle tube 18 on members 15, as illustrated in Figures 3 and 4. An axle 19 is rotatably mounted in tube 18, each end protruding a distance through the tube. I securely mount a rachet collar 20 on each end of axle 19 adjacent the ends of tube 18 and I mount a sprocket 21 on preferably the left hand collar 20.

Rubber tired wheels 25—25 are rotatably mounted on the ends of shaft 19 by means of hubs 26—26. Suitable means are provided for driving wheels 25 by means of shaft 19 through rachets as follows:

In Figure 4, I illustrate rachet pockets 28 in member 20. Rachet pins 29 are slidably mounted in hubs 26 and adapted to be urged into the rachet pockets by means of springs 30—30. Thus both wheels 25 will be rachet driven forwardly by shaft 19 but in making a turn, one or the other of the wheels may travel ahead of the shaft because of the action of the rachets.

The forward ends of members 15 are bent downwardly as at 31, the downwardly extending portion being pointed (not shown) so it will easily enter the ground (see Figure 1). The object of members 31 is to hold the transport truck from moving while the mower is being moved on the frame to the position shown in this figure.

Members 15 are each provided with raised portions 32 so when the mower is on the transport in position as illustrated in Figure 1, drum 10 will rest against the rear edge of these raises which temporarily hold the mower from moving down the incline and out of position previous to the time it is secured to the transport frame, as will hereinafter appear.

The rear ends of members 15 are turned upwardly at right angles as at 35—35 against which transverse bar 13 on the mower will rest, as illustrated in Figure 1. A shaft 36 is rotatably mounted on members 35 near their upper ends by means of bearing brackets 37—37, which are suitably secured to members 35.

I mount hooked members 38 on the outer ends of member 36 and provide each with a coil spring 39, one end of which is anchored in an aperture in member 37 and the other end extending over the hook so as to normally hold the hooks in the position shown in Figure 1 so when member B is moved to the position shown in this figure, member 13 will pass over the ends of the hooks.

An arm 45 is secured to a member 36, the free end of which is bent at right angles as at 46. A foot pedal 47 is hingedly mounted on member 46 midway its length by means of a sleeve 48, the pedal being shaped as illustrated in Figure 1 having upper and lower flanges.

I secure to the lower flange a rod 49, the rod passing through an aperture in the flange and being threaded as at 50 so the rod may be adjusted to different lengths by means of nuts 51—51. The free end of rod 49 is hooked as at 52, thus it will be seen, by scrutinizing Figure 1, that if the operator places his foot on pedal 47 and presses down, hooks 38 will contact member 13 on opposite ends, and a further pressure on the pedal will lift the rear end of the mower to the position shown in Figure 2, at which time pedal 47 may be moved so hook 52 will engage bar 17, thus the foot pressure may be released from the pedal and members 38 will then act to hold the mower in its raised position and preserve the contact between members 13 and 35.

It will be seen that if it is desired to unload the mower, all that is necessary is to press on the rear of pedal 47 and release hook 52 and then permit hooks 38 to lower the mower.

Figure 2:
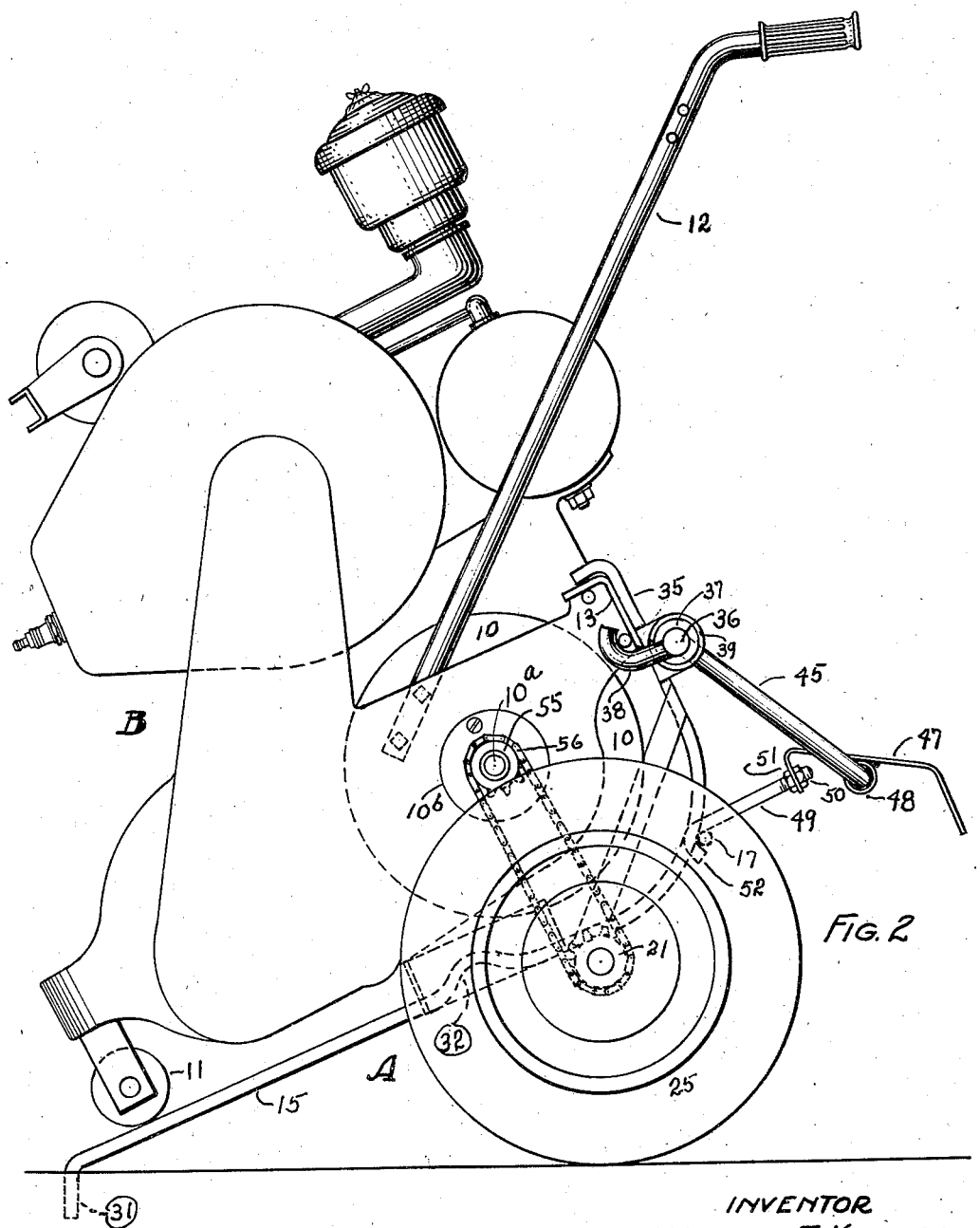
Fig. 2 is a view similar to Figure 1 after the mower has been lifted and locked into position.

I provide means for connecting the power mechanism of the mower to the carrying wheels of the transport truck as follows:

A sprocket 55 is preferably mounted on shaft 10ª of drum 10 which is adjacent and in line with sprocket 21. I provide a chain 56 which is adapted to be taut when the mower is in its raised position, as illustrated in Figure 2. Before the mower has been raised, chain 56 which has been previously positioned around tube 18 is placed on sprockets 21 and 55 (see Figure 5) and then when the mower is raised, as already described, the chain will assume the position shown in Figures 2 and 6.

In a structure of the class, where sprocket 55 is a considerable distance from hooks 38, it will be apparent that when the mower power is applied to drive the transport truck, sprockets 21 and 55 will be pulled together slightly and the chain loosened to some extent because of the yielding action of the mower support. I remedy this defect by means of a thrust bracket, as illustrated in Figures 6 and 7 as follows:

A bracket 57 is secured to member 15 or to member 18, having hingedly mounted thereon a forked head 58. A bracket 59 is screw threaded into member 58 and is provided with a forwardly extending portion 60 and a rearwardly and upwardly extending portion 61, providing a depression as at 62 into which the bearing 10ᵇ of the drum may rest.

After the mower has been lifted, member 59 is pressed forwardly to the position shown in Figure 6; the length of the adjustment of this member being such as will maintain a suitable tautness of chain 56.

When it is desired to unload the mower, all that is necessary is to swing member 59 rearwardly, after which the mower frame may be dropped to the position shown in Figure 1. The chain will then be loose, as illustrated in Figure 5, and may be lifted from sprocket 55 and the mower moved down the incline to the surface of the ground.

It will be noted by scrutinizing Figures 1 and 2 that the mower handles are in a position so the operator may lift anchors 31 from the ground by pressing down on the handles, the device being designed so when the handles are pressed down far enough, the center of gravity of the mower will be practically directly above the transport wheels, after which the power may be applied and the transport conveniently guided by the operator.

Clearly I have provided a power driven lawn mower transport which is simple, light and strong, easily manufactured at low cost and on which the mower may be easily and quickly loaded and connected for power transportation without the use of hand tools or in other words, without making any changes on either of the units.

The mower need not be the design shown. This design is shown as a matter of convenience in describing my device and the manner of mounting the mower. I have described member 10 as being a driving drum. Clearly mowers with two carrying and driving wheels may be loaded and transported in the same manner.

Obviously many minor detail changes may be made without departing from the spirit and scope of the present invention, as recited in the appended claims.

Having thus shown and described my invention, I claim:

1. A device of the class described, comprising a frame having carrying wheels near its rear end, the front end adapted to rest on the ground, the side members of the frame adapted to receive the end of the driving drum of a power lawn mower, the front wheels of the mower resting on the front end of said frame, the rear end of said side members extending upwardly forming positioning stops for the mower, a transverse shaft rotatably mounted on said stops and having secured to the ends thereof forwardly and upwardly extending hooks adapted to engage said mower, said shaft having a rearwardly extending arm with a pedal transversely hingedly mounted on its free end, a forwardly extending hooked shaft adjustably secured to the lower part of said pedal, anchoring means on said frame near the rear end thereof, whereby when said pedal is pressed downwardly, said first hooks will be caused to engage said mower and raise the rear end thereof, and whereby said hooked shaft may be caused to engage said anchor and lock the mower in its raised position, and whereby pressure on the handles of said mower will raise the forward end of the transport truck from the ground so the truck may be moved over the ground as a transport for the mower.

2. A device as recited in claim 1 including; sprockets and a chain forming an operating connection between said first and second wheels whereby the transport truck may be propelled by the power plant of said mower.

3. A device as recited in claim 1 including; the front end of said frame having down turned portions adapted to penetrate the soil whereby the truck will be anchored while the mower is being moved into position on the truck.

4. A device as recited in claim 1 including; a sprocket secured to the axle of said wheels and a sprocket secured to the axle of said drum in alignment with said first sprocket, a chain forming an operating connection between said sprockets.

5. A device as recited in claim 1 including; a sprocket secured to the axle of said wheels and a sprocket secured to the axle of said drum in alignment with said first sprocket, a chain forming an operating connection between said sprockets, adjustable and detachable means adapted to form a rigid connection between said sprockets.

6. A device as recited in claim 1 including; the end members of said frame having a raised portion against the rear surface of which said drum rests before the mower is raised to its transporting position.

7. A device of the class described, comprising a frame having carrying wheels near its rear end, the front end adapted to rest on the ground, the side members of the frame extending rearwardly and upwardly and adapted to receive the driving wheels or drum of a power lawn mower, the front wheels of the mower resting on the front end of said frame, the rear end of said side members extending upwardly forming positioning stops for the mower, a transverse shaft rotatably mounted on said stops and having secured thereto near or at its ends forwardly and upwardly extending hooks adapted to engage said mower, said shaft having a rearwardly extending arm with a pedal transversely hingedly mounted on its free end, a forwardly extending hooked shaft adjustably secured to the lower part of said pedal, anchoring means on said frame at or near the rear end thereof, whereby when said pedal is pressed downwardly, said first hooks will be caused to engage said mower and raise the rear end thereof, and whereby said hooked shaft may be caused to engage said anchor and lock the mower in its raised position, and whereby pressure on the handles of said mower will raise the forward end of the transport truck from the ground so the truck may be moved over the ground as a transport, sprockets and a chain forming an operating connection between said first and second wheels whereby the transport truck may be propelled by the power plant of said mower, a spacer hingedly mounted on said transport frame adjacent the axis of said first wheels and its sprocket and having means for adjusting its length and means whereby said spacer may be manually moved into engagement with said mower adjacent its sprocket to thereby rigidly fix the distance between said sprockets.

8. A power driven lawn mower carrying device, comprising a frame having carrying and driving wheels near its rear end, side frame members, the front ends thereof being adapted to rest on the ground and extending rearwardly and upwardly and adapted to receive the driving wheels or drum of the mower, the front wheels of the mower resting on the front ends of the side members, the rear ends of said side members having means whereby the rear end of the mower may be manually lifted and locked in its lifted position, means forming an operating connection between the mower and said frame carrying and driving wheels when the rear end of the mower is lifted whereby the device may be driven and guided by the driving, controlling and guiding means on the mower, said operating connection comprising sprockets and a chain therearound, the chain adapted to be made taut when the rear end of said mower is in its lifted position.

WILLIAM F. KRENZKE.